United States Patent
Li et al.

(10) Patent No.: US 9,042,243 B2
(45) Date of Patent: May 26, 2015

(54) ADAPTIVE PEER DISCOVERY BASED ON NON PEER DISCOVERY TRANSMISSIONS AND DEVICE DENSITY FOR WI-FI

(75) Inventors: Junyi Li, Chester, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 13/008,976

(22) Filed: Jan. 19, 2011

(65) Prior Publication Data

US 2012/0182890 A1 Jul. 19, 2012

(51) Int. Cl.
*H04L 12/26* (2006.01)
*H04W 8/00* (2009.01)
*H04W 16/14* (2009.01)

(52) U.S. Cl.
CPC .............. *H04W 8/005* (2013.01); *H04W 16/14* (2013.01)

(58) Field of Classification Search
USPC .................... 375/295, 356; 709/202; 370/252
See application file for complete search history.

(56) References Cited

U.S. PATENT DOCUMENTS

| | | | |
|---|---|---|---|
| 7,613,156 B2 | 11/2009 | Rittle et al. | |
| 8,189,491 B2 * | 5/2012 | Laroia et al. | 370/252 |
| 8,798,029 B2 | 8/2014 | Soliman | |
| 2006/0140215 A1 * | 6/2006 | Fleming | 370/468 |
| 2007/0206554 A1 | 9/2007 | Laroia et al. | |
| 2007/0211678 A1 * | 9/2007 | Li et al. | 370/338 |
| 2009/0010232 A1 * | 1/2009 | Laroia et al. | 370/338 |
| 2009/0016229 A1 * | 1/2009 | Wu et al. | 370/252 |
| 2009/0016248 A1 * | 1/2009 | Li et al. | 370/310.1 |
| 2009/0017861 A1 | 1/2009 | Wu et al. | |
| 2009/0327395 A1 * | 12/2009 | Park et al. | 709/202 |
| 2010/0157863 A1 | 6/2010 | Gong et al. | |
| 2010/0172275 A1 | 7/2010 | Wu et al. | |
| 2011/0007639 A1 * | 1/2011 | Richardson | 370/252 |
| 2011/0021235 A1 * | 1/2011 | Laroia et al. | 455/522 |
| 2011/0085453 A1 * | 4/2011 | Wu et al. | 370/252 |
| 2011/0103264 A1 * | 5/2011 | Wentink | 370/255 |
| 2011/0205887 A1 * | 8/2011 | Wu et al. | 370/229 |
| 2012/0011247 A1 * | 1/2012 | Mallik et al. | 709/224 |
| 2012/0057646 A1 * | 3/2012 | Jovicic et al. | 375/295 |
| 2012/0057647 A1 | 3/2012 | Chen et al. | |
| 2012/0134456 A1 * | 5/2012 | Li et al. | 375/356 |

FOREIGN PATENT DOCUMENTS

| | | |
|---|---|---|
| EP | 1113690 | 7/2001 |
| EP | 2034675 A2 | 3/2009 |

(Continued)

OTHER PUBLICATIONS

Wu. et al., "FlashLinQ: A synchronous distributed scheduler for peer-to-peer ad hoc networks", Oct. 1, 2010, IEEE, 2010 48th Annual Allerton Conference on Sep. 29, 2010-Oct. 1, 2010.*

(Continued)

*Primary Examiner* — Brian J Gillis
*Assistant Examiner* — Amy Ling
(74) *Attorney, Agent, or Firm* — James K. O'Hare

(57) ABSTRACT

A method, an apparatus, and a computer program product are provided in which a number of wireless devices communicating peer discovery information are estimated. In addition, a transmission time period for transmitting peer discovery information is determined based on the estimated number of wireless devices.

28 Claims, 8 Drawing Sheets

(56) References Cited

FOREIGN PATENT DOCUMENTS

| JP | 2009049522 A | 3/2009 |
| WO | 2008128816 A1 | 10/2008 |
| WO | 2009009572 A2 | 1/2009 |
| WO | WO-2010017140 A1 | 2/2010 |

OTHER PUBLICATIONS

Kumar et al., "The ultra wideband WiMedia standard", Aug. 26, 2008, IEEE, Signal Processing Magazine, IEEE (vol. 25, Issue:5).*
Stevanovic, "ZigBee/IEEE 802.15.4 Standard", Jun. 20, 2007, ZigBee Alliance.*
International Search Report and Written Opinion—PCT/US2012/021461—ISA/EPO—May 21, 2012.

* cited by examiner

ADAPTIVE PEER DISCOVERY BASED ON NON PEER DISCOVERY TRANSMISSIONS AND DEVICE DENSITY FOR WI-FI

BACKGROUND

1. Field

The present disclosure relates generally to communication systems, and more particularly, to adaptive peer discovery based on non peer discovery transmissions and device density for Wi-Fi.

2. Background

Power consumption for peer discovery of a device is based on the amount of time the device stays awake in order to transmit or to receive peer discovery signals. Power consumption for peer discovery may be reduced by coordinating the awake times of different devices. Additional methods of reducing power consumption of peer discovery are needed.

SUMMARY

In an aspect of the disclosure, a method, an apparatus, and a computer program product are provided in which a number of wireless devices communicating peer discovery information are estimated. In addition, a transmission time period for transmitting peer discovery information is determined based on the estimated number of wireless devices.

DETAILED DESCRIPTION

Figure 1:
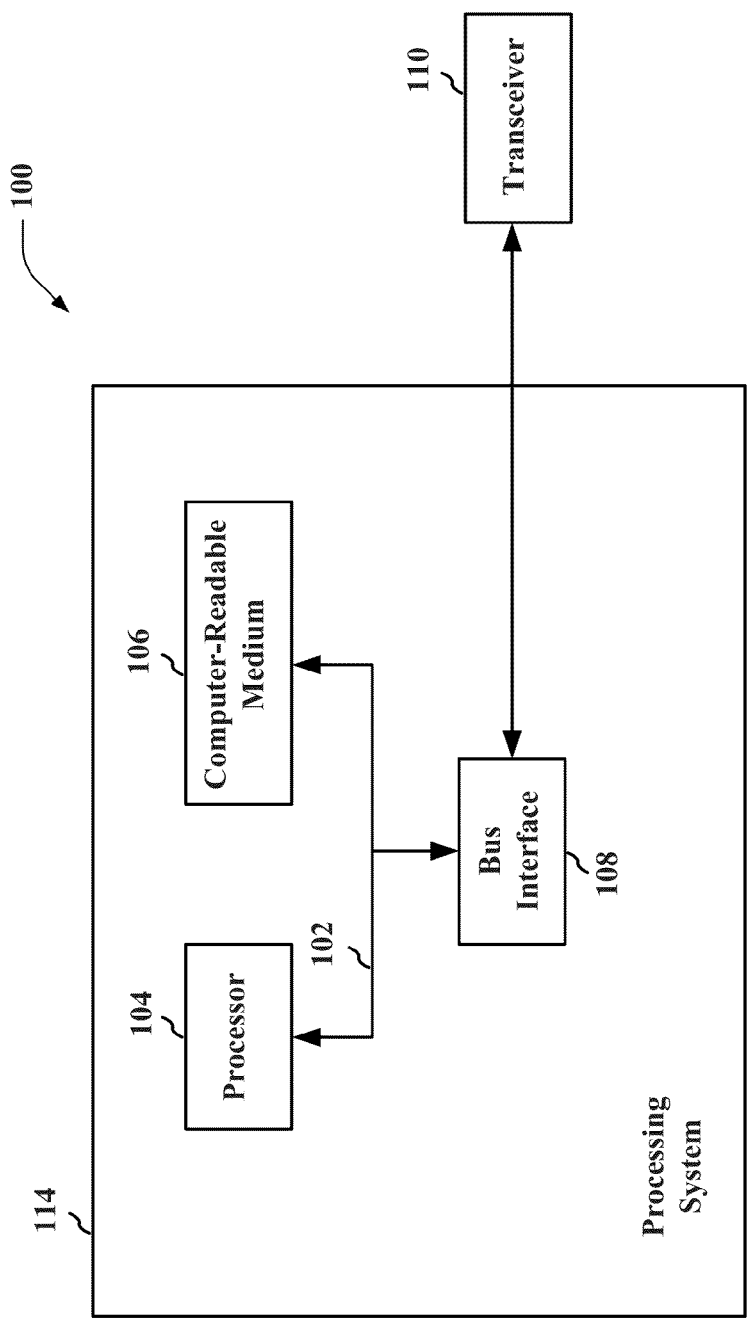
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
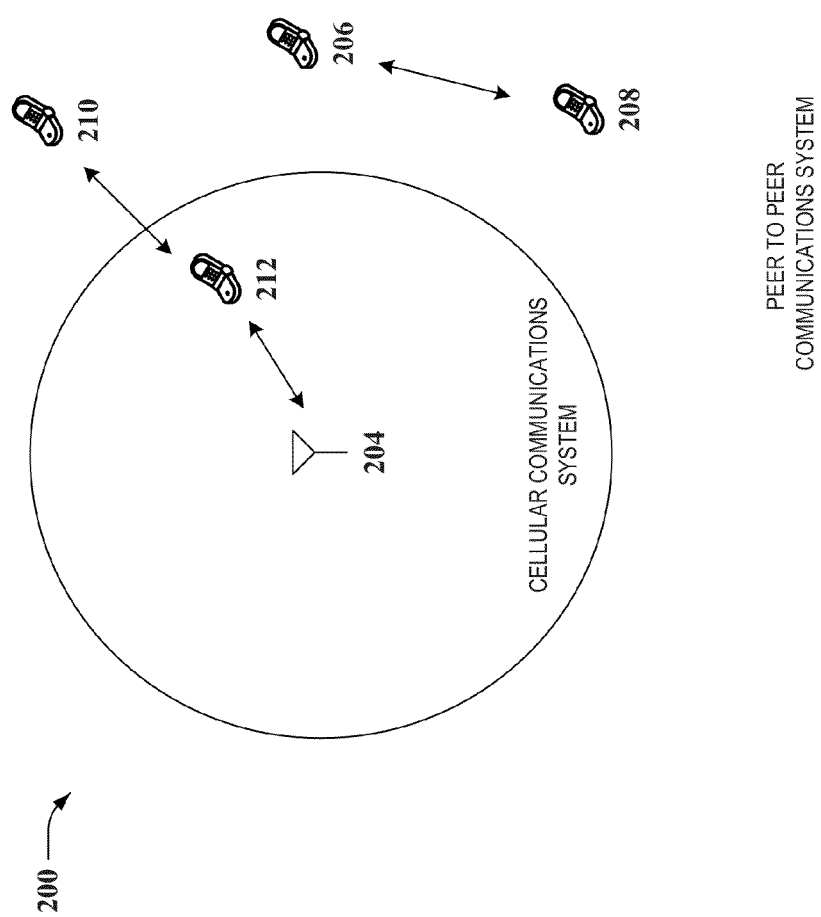
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus may be discussed within the context of one of the aforementioned peer-to-peer communication systems. However, one of ordinary skill in the art would understand that the exemplary methods and apparatuses are applicable more generally to a variety of other wireless peer-to-peer communication systems.

Figure 3:
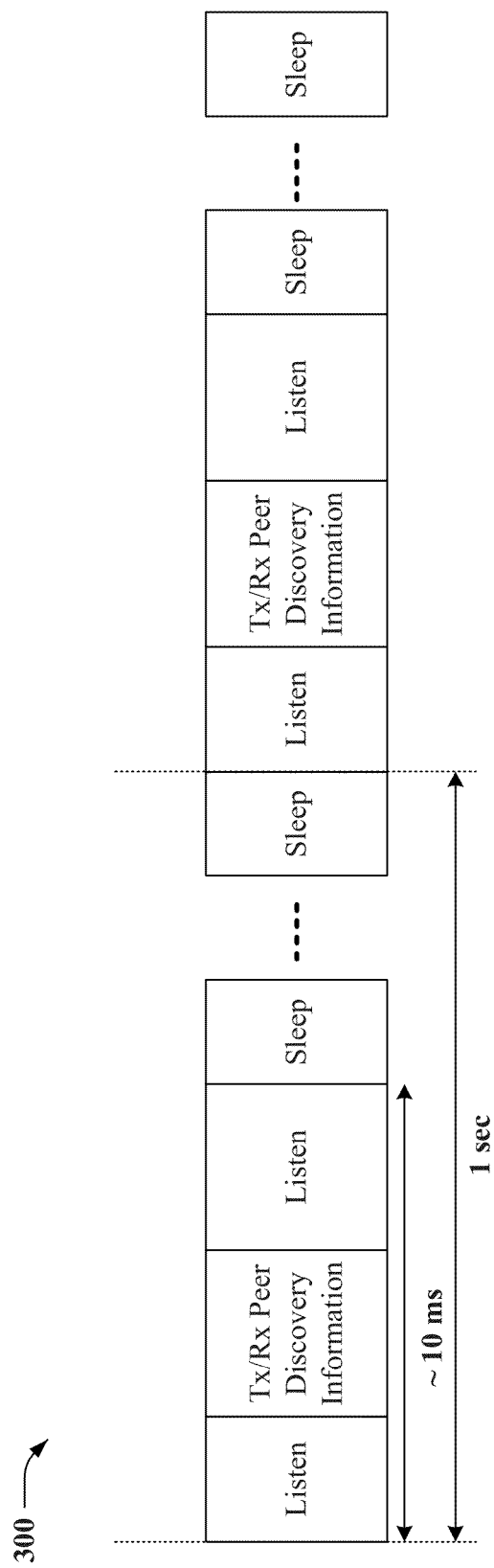
FIG. 3 is a diagram illustrating a fixed peer discovery time period.

FIG. 3 is a diagram 300 illustrating a fixed peer discovery time period. As shown in FIG. 3, the peer discovery time period may be a fixed awake time period, such as 10 ms. The peer discovery time period may by coordinated among different wireless devices through a globally synchronous source (e.g., CDMA 2000). Each wireless device stays awake for the fixed awake time period. The fixed awake time period determines the power consumption of peer discovery for each of the devices and the number of devices that can be discovered. A shorter awake time period reduces the power consumption of peer discovery at the expense of reducing the number of devices that can be discovered. A longer awake time period increases the number of devices that can be discovered at the expense of increasing the power consumption of peer discovery. Some wireless devices may be within an area of a higher density of wireless devices and therefore may need a longer period of peer discovery than wireless devices within an area of a lower density of wireless devices. As such, a method in which wireless devices each dynamically determine its awake time period would be beneficial.

Figure 4:
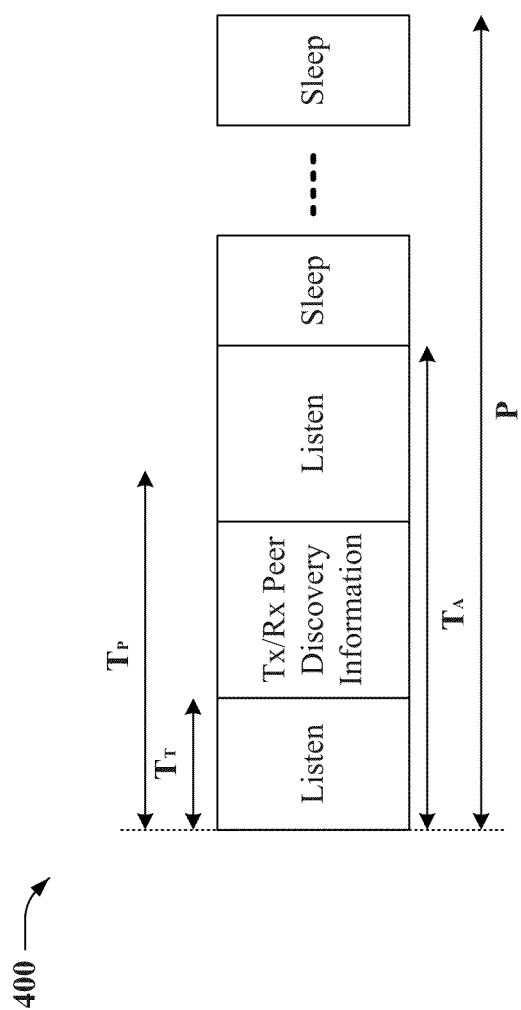
FIG. 4 is a diagram illustrating an exemplary method with a dynamic peer discovery time period.

FIG. 4 is a diagram 400 illustrating an exemplary method with a dynamic peer discovery time period. As shown in FIG. 4, each wireless device in a peer-to-peer communication network may determine its awake time period $T_A$ within a total repetitive time period P. Each wireless device may also determine a transmission time $T_T$ within a transmission time period $T_P$ within the awake time period $T_A$. Both the transmission time period $T_P$ and the awake time period $T_A$ may be dynamically changed based on an estimated number of wireless devices m communicating peer discovery information (i.e., device density). Because the estimated number of wireless device m is not known a priori and can change suddenly due to mobility, wireless devices may dynamically change their transmission time period $T_P$ and their awake time period $T_A$ each time period P or set of time periods sP (s being an integer greater than one). Wireless devices may be in an area in which non peer discovery transmissions or other interference are received (e.g., legacy Wi-Fi). Because the non peer discovery transmissions or other interference will delay the peer discovery transmissions, wireless devices may also dynamically change their transmission time $T_T$ and their awake time period $T_A$ based on received non peer discovery transmissions or other interference.

Figure 5:
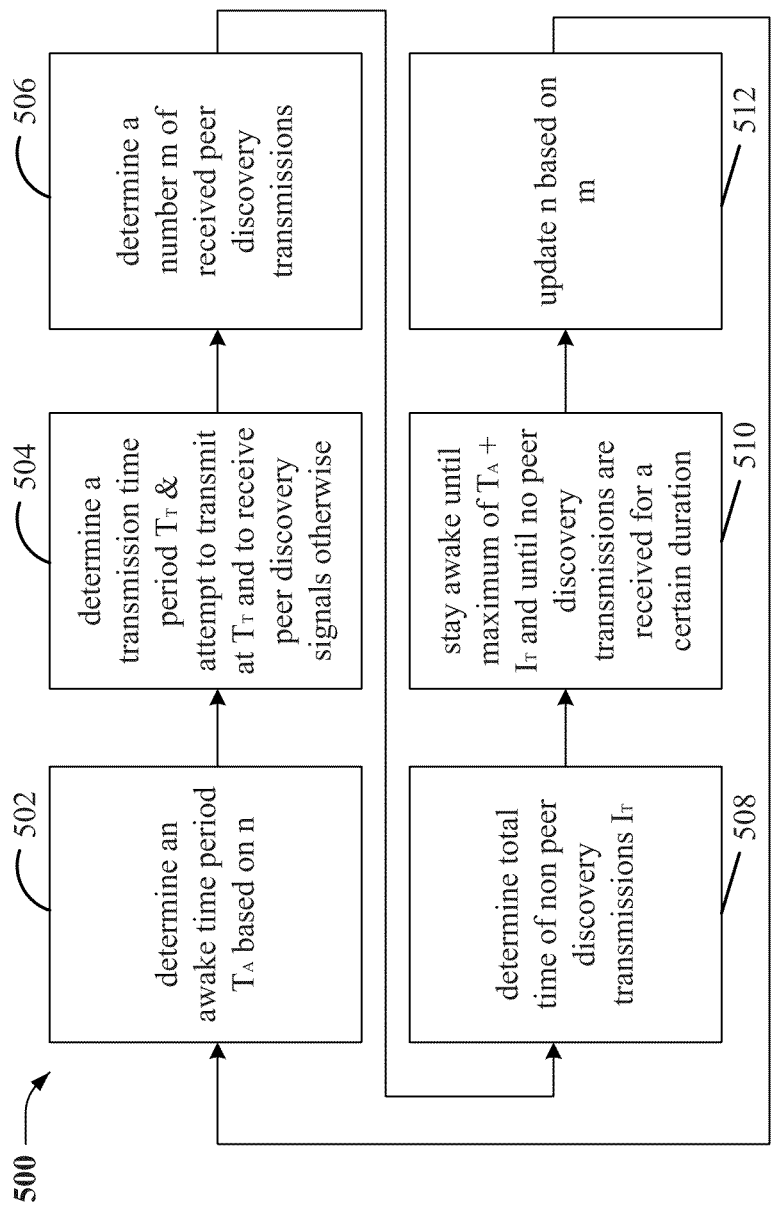
FIG. 5 is a flow chart of a method of wireless communication.

FIG. 5 is a flow chart 500 of a method of wireless communication. As shown in FIG. 5, a wireless device may determine an awake time period $T_A$ based on a value n, which is a function of an estimated number of wireless devices m communicating peer discovery information from a previous time period (502). Generally, the awake time period $T_A$ may be approximately equal to $k*n*t_p$, where k>1 and $t_p$ is an average time period for a peer discovery transmission. For example, k may equal 2 and $t_p$ may be equal to 250 us. In such a configuration, a wireless device would determine an awake time period $T_A$ equal to $2*n*250$ us. The wireless device also determines a transmission time $T_T$ within a transmission time period $T_P$. The wireless device attempts to transmit at the transmission time period $T_T$ and to receive peer discovery signals otherwise (504). Generally, the transmission time period $T_P$ may be greater than 0 and less than or equal to $j*n*t_p$, where j>0. For example, j may be equal to 1.5. In such a configuration, a wireless device may uniformly randomly (i.e., randomly with equal probabilities) determine a transmission time $T_T$ between 0 and $1.5*n*250$ us. The wireless device determines a number m of received peer discovery transmissions (506). The wireless device may also determine a total time of non peer discovery transmissions (referred to as interference) $I_T$ (508). Based on the interference $I_T$, the wireless device extends its awake time period $T_A$ until a maximum of $T_A+I_T$ and until no peer discovery transmissions are received for a certain duration (510). Extending the awake time period $T_A$ until no peer discovery transmissions are received for a certain duration (e.g., 1 ms) ensures that in case of mobility into a dense scenario with many wireless devices, the estimate of the number of wireless devices m communicating peer discovery information quickly converges to an accurate estimate. The wireless device then updates n based on the number of wireless devices m communicating peer discovery information (512). The value n may be bounded such that $b_L \leq n \leq b_U$, where $b_L$ is a lower bound, $b_U$ is an upper bound, $n=b_L$ when $m<b_L$, $n=b_U$ when $m>b_U$, and $n=m$ when $b_L \leq m \leq b_U$.

Figure 6:
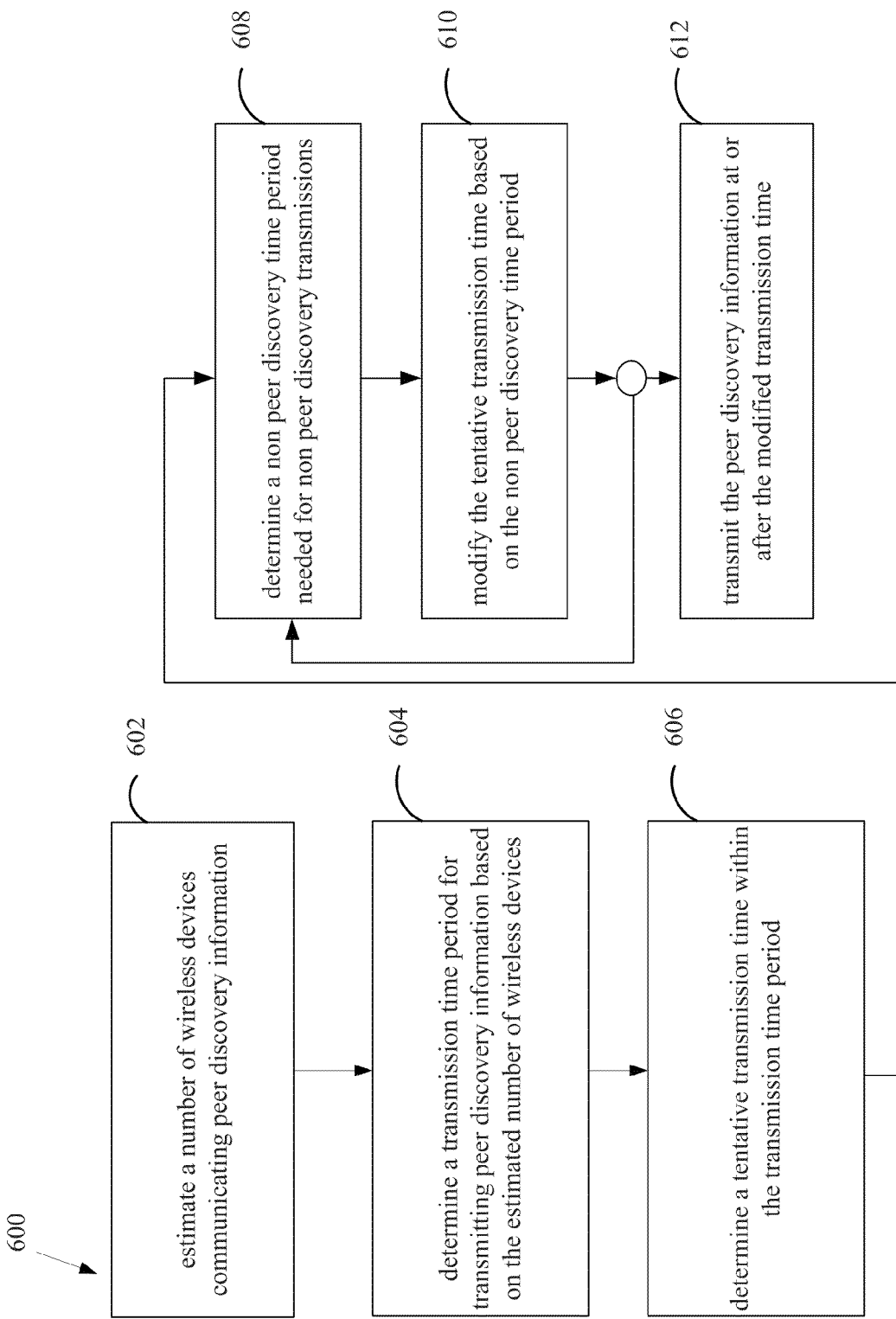
FIG. 6 is another flow chart of a method of wireless communication.

FIG. 6 is another flow chart 600 of a method of wireless communication. As shown in FIG. 6, a wireless device estimates a number of wireless devices m communicating peer discovery information (602). In addition, the wireless device determines a transmission time period $T_P$ for transmitting peer discovery information based on the estimated number of wireless devices m (604). As discussed in relation to FIG. 5, the number of wireless devices m is estimated in a previous peer discovery time period and the transmission time period $T_P$ is determined for a current peer discovery time period. The wireless device may determine a tentative transmission time $T_T$ within the transmission time period (606). As discussed supra, the tentative transmission time $T_T$ may be selected uniformly randomly within the transmission time period $T_P$. The wireless device may also determine a non peer discovery time period $I_S$ needed for non peer discovery transmissions (608). The wireless device may then modify the tentative transmission time $T_T$ based on the non peer discovery time period $I_S$ (610). For example, the modified transmission time may be approximately equal to $T_T+I_S$. The wireless device repeats steps 608 and 610 until no non peer discovery transmissions are received to delay the tentative transmission time $T_T$. At or after the modified tentative transmission time $T_T$, the wireless device transmits the peer discovery information (612).

An example best demonstrates steps 606 through 612. Assume the transmission time period $T_P=10$ ms and the tentative transmission time $T_T=4$ ms. If the wireless device receives a non peer discovery transmission of a duration of 1 ms from 2 ms to 3 ms, the wireless device will modify the tentative transmission time $T_T$ to 5 ms. If the wireless device receives another non peer discovery transmission starting at 4.5 ms with a duration of 500 us, the wireless devices will modify the tentative transmission time $T_T$ from 5 ms to 5.5 ms. Having not receiving additional non peer discovery transmissions at 5.5 ms, the wireless device transmits its peer discovery at 5.5 ms to 5.6 ms. Any non peer discovery transmissions received after the peer discovery transmission, does not affect the tentative transmission time $T_T$.

Figure 7:
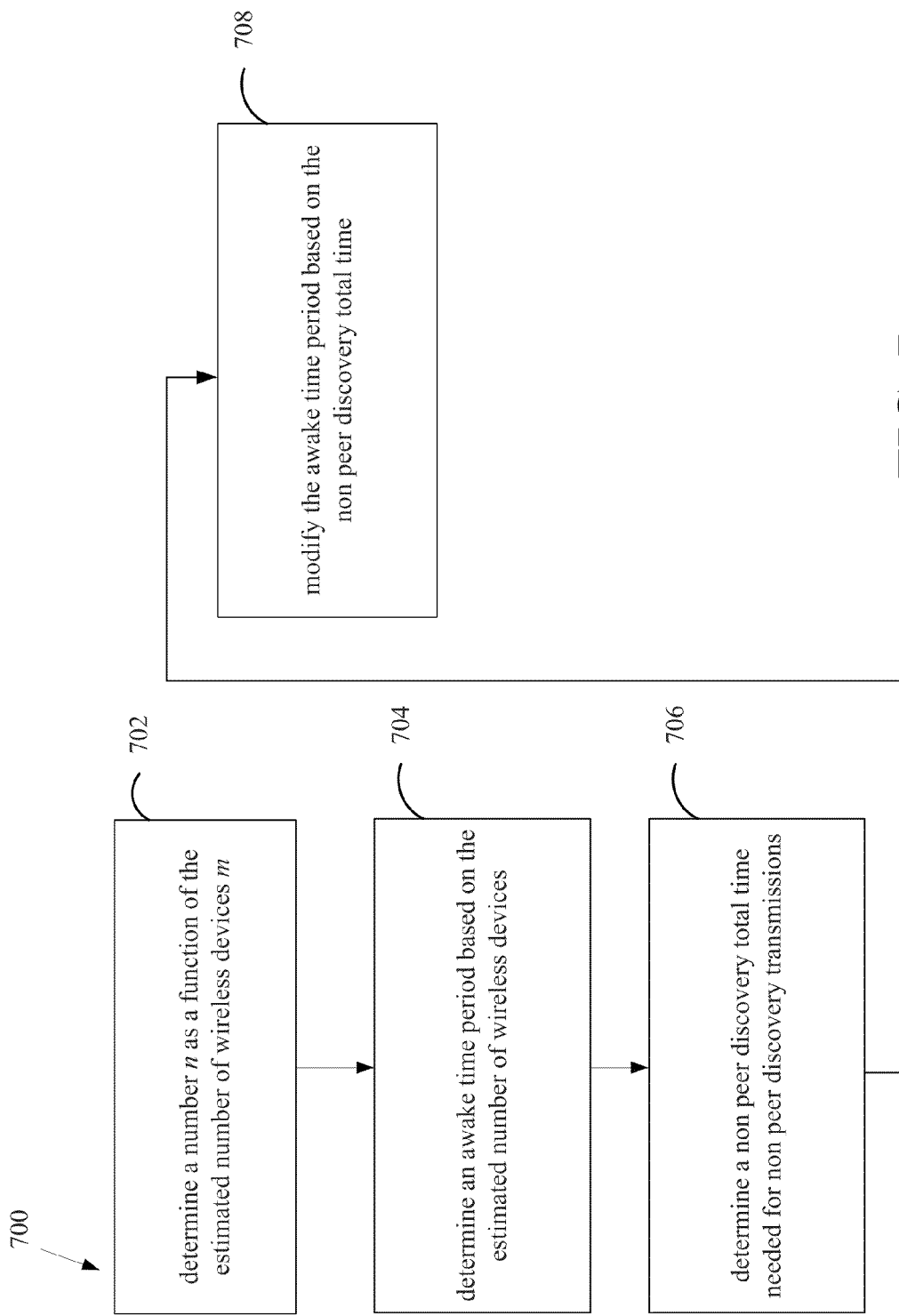
FIG. 7 is yet another flow chart of a method of wireless communication.

FIG. 7 is yet another flow chart 700 of a method of wireless communication. As shown in FIG. 7, the wireless device may determine a number n as a function of the estimated number of wireless devices m (702). In one configuration, the number n is further based on remaining battery power of the wireless device. In such a configuration, the number n may be decreased when a battery power of the wireless device is low. As discussed supra, the wireless device may bound the number n such that n is greater than or equal to a lower bound $b_L$ and less than or equal to an upper bound $b_U$, n is approximately equal to the upper bound $b_U$ when m is greater than or equal to the upper bound $b_U$, n is approximately equal to the lower bound $b_L$ when m is less than or equal to the lower bound $b_L$, and n is approximately equal to m when m is greater than or equal to the lower bound $b_L$ and less than or equal to the upper bound $b_U$. Furthermore, the wireless device may determine a transmission time period $T_P$ to be greater than 0 and less than or equal to $j*n*t_p$, where $t_p$ is an average time period for a peer discovery transmission and j is greater than 0. In one configuration, j is approximately equal to 1.5.

The wireless device may determine an awake time period $T_A$ based on the estimated number of wireless devices m (704). The awake time period $T_A$ may be approximately equal to $k*n*t_p$, where $t_p$ is an average time period for a peer discovery transmission and k is greater than 1. In one configuration, k is approximately equal to 2. The wireless device may also determine a non peer discovery total time $I_T$ needed for non peer discovery transmissions (706) and modify the awake time period $T_A$ based on the non peer discovery total time $I_T$ (708). The modified awake time period may be approximately equal to $k*n*t_p+I_T$, where $t_p$ is an average time period for a peer discovery transmission, n is a function of the estimated number of wireless devices m, k is greater than 1, and $I_T$ is the non peer discovery total time. Furthermore, the awake time period $T_A$ may be extended until no peer discovery transmissions are received for a period of time.

The exemplary methods provide a power efficient discovery of devices in an ad-hoc network (e.g., Wi-Fi) that work seamlessly for different device densities and accounts for legacy Wi-Fi interference. The methods opportunistically minimize or otherwise reduce power consumption for peer discovery based on device density and an observed interference. The methods take into account that distributed scheduling causes collisions and/or suboptimal use of resources, that a device density will not be known a priori and can change suddenly due to mobility, and that there may be other interference, such as legacy Wi-Fi, that will delay peer discovery transmissions. If there is no interference, the estimate of n is fairly accurate. In case of mobility, the estimate of n should converge to an accurate estimate within a single peer discovery repetition. If there is interference, the interference duration from one burst to another is assumed to be independent, and therefore not predictable. The interference duration is measured in each burst and the peer discovery duration is increased based on the measured duration.

Figure 8:
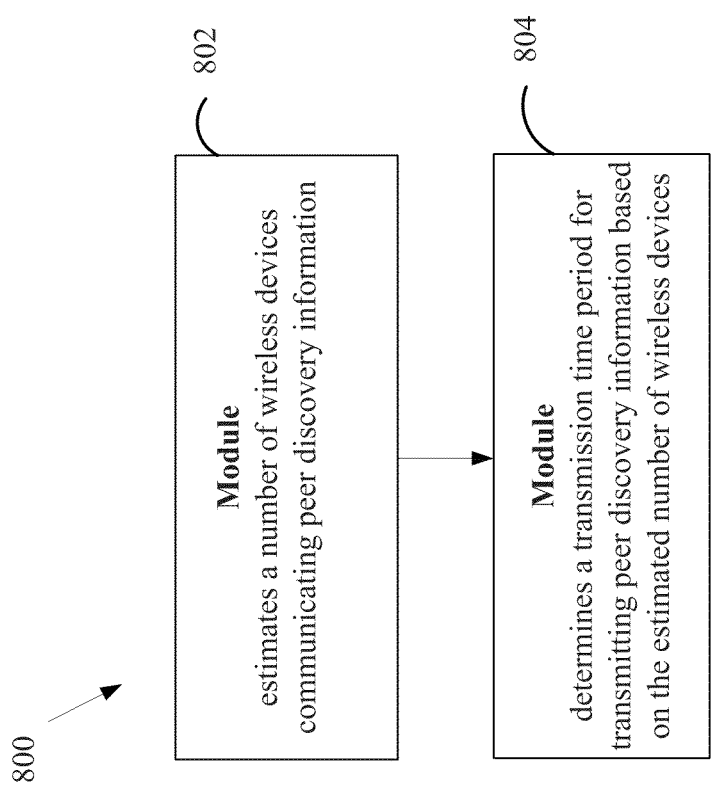
FIG. 8 is a conceptual block diagram illustrating the functionality of an exemplary apparatus.

FIG. 8 is a conceptual block diagram 800 illustrating the functionality of an exemplary apparatus 100. The apparatus 100 includes a module 802 that estimates a number of wireless devices m communicating peer discovery information. In addition, the apparatus 100 includes a module 804 that determines a transmission time period $T_P$ for transmitting peer discovery information based on the estimated number of wireless devices m. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication includes means for estimating a number of wireless devices communicating peer discovery information, and means for determining a transmission time period for transmitting peer discovery information based on the estimated number of wireless devices. The apparatus 100 may further include means for determining a tentative transmission time within the transmission time period, means for determining a non peer discovery time period needed for non peer discovery transmissions, means for modifying the tentative transmission time based on the non peer discovery time period, and means for transmitting the peer discovery information at or after the modified transmission time. The apparatus 100 may further include means for determining a number n as a function of the estimated number of wireless devices m. The apparatus 100 may further include means for determining an awake time period based on the estimated number of wireless devices. The apparatus 100 may further include means for determining a non peer discovery total time needed for non peer discovery transmissions, and means for modifying the awake time period based on the non peer discovery total time. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method performed by a wireless device, comprising:
   estimating a number of wireless devices m communicating peer discovery information based on a previous peer discovery time period;
   determining a number n as a function of the estimated number of wireless devices m, where n is a natural number;
   determining a transmission time period for transmitting peer discovery information for a current peer discovery time period based on the number n;
   determining a tentative transmission time within the transmission time period;
   determining a non peer discovery time period needed for non peer discovery transmissions;
   modifying the tentative transmission time based on the non peer discovery time period; and
   transmitting the peer discovery information at or after the modified transmission time.

2. The method of claim 1, wherein the tentative transmission time is selected uniformly randomly within the transmission time period.

3. The method of claim 1, wherein the modified transmission time is approximately equal to $T_T + I_s$, where $T_T$ is the tentative transmission time and $I_s$ is the non peer discovery time period.

4. The method of claim 1, wherein n is further based on remaining battery power of the wireless device.

5. The method of claim 1, further comprising determining an awake time period based on the estimated number of wireless devices m.

6. The method of claim 5, further comprising:
   determining a non peer discovery total time needed for non peer discovery transmissions; and
   modifying the awake time period based on the non peer discovery total time.

7. The method of claim 6, wherein the awake time period is extended until no peer discovery transmissions are received for a period of time.

8. A method performed by a wireless device, comprising:
   estimating a number of wireless devices m communicating peer discovery information based on a previous peer discovery time period;
   determining a number n as a function of the estimated number of wireless devices m, where n is a natural number; and
   determining a transmission time period for transmitting peer discovery information for a current peer discovery period based on the number n,
   wherein n is greater than or equal to a lower bound and less than or equal to an upper bound, n is approximately equal to the upper bound when m is greater than or equal to the upper bound, n is approximately equal to the lower bound when m is less than or equal to the lower bound, and n is approximately equal to m when m is greater than or equal to the lower bound and less than or equal to the upper bound.

9. A method performed by a wireless device, comprising:
   estimating a number of wireless devices m communicating peer discovery information based on a previous peer discovery time period;
   determining a number n as a function of the estimated number of wireless devices m, where n is a natural number; and
   determining a transmission time period for transmitting peer discovery information for a current peer discovery period based on the number n,
   wherein the transmission time period is greater than 0 and less than or equal to $j*n*t_p$, where $t_p$ is an average time period for a peer discovery transmission, and j is a rational number greater than 0.

10. The method of claim 9, wherein j is approximately equal to 1.5.

11. A method performed by a wireless device, comprising:
    estimating a number of wireless devices m communicating peer discovery information based on a previous peer discovery time period;
    determining a number n as a function of the estimated number of wireless devices m, where n is a natural number;
    determining a transmission time period for transmitting peer discovery information for a current peer discovery period based on the estimated number of wireless devices m; and
    determining an awake time period based on the estimated number of wireless devices m,
    wherein the awake time period is approximately equal to $k*n*t_p$, where $t_p$ is an average time period for a peer discovery transmission, and k is a natural number greater than 1.

12. The method of claim 11, wherein k is approximately equal to 2.

13. A method performed by a wireless device, comprising:
estimating a number of wireless devices m communicating peer discovery information based on a previous peer discovery time period;
determining a number n as a function of the estimated number of wireless devices m, where n is a natural number;
determining a transmission time period for transmitting peer discovery information for a current peer discovery period based on the number n;
determining an awake time period based on the estimated number of wireless devices m;
determining a non peer discovery total time needed for non peer discovery transmissions; and
modifying the awake time period based on the non peer discovery total time,
wherein the modified awake time period is approximately equal to $k*n*t_p+I_T$, where $t_p$ is an average time period for a peer discovery transmission, n is a function of the estimated number of wireless devices m, k is a natural number greater than 1, and $I_T$ is the non peer discovery total time.

14. An apparatus for wireless communication, comprising:
means for estimating a number of wireless devices m communicating peer discovery information based on a previous peer discovery time period;
means for determining a number n as a function of the estimated number of wireless devices m, where n is a natural number;
means for determining a transmission time period for transmitting peer discovery information for a current peer discovery time period based on the number n;
means for determining a tentative transmission time within the transmission time period;
means for determining a non peer discovery time period needed for non peer discovery transmissions;
means for modifying the tentative transmission time based on the non peer discovery time period; and
means for transmitting the peer discovery information at or after the modified transmission time.

15. The apparatus of claim 14, wherein the tentative transmission time is selected uniformly randomly within the transmission time period.

16. The apparatus of claim 14, wherein the modified transmission time is approximately equal to $T_T+I_s$, where $T_T$ is the tentative transmission time and $I_s$ is the non peer discovery time period.

17. The apparatus of claim 14, wherein n is further based on remaining battery power of the apparatus.

18. The apparatus of claim 14, further comprising means for determining an awake time period based on the estimated number of wireless devices m.

19. The apparatus of claim 18, further comprising:
means for determining a non peer discovery total time needed for non peer discovery transmissions; and
means for modifying the awake time period based on the non peer discovery total time.

20. The apparatus of claim 19, wherein the awake time period is extended until no peer discovery transmissions are received for a period of time.

21. An apparatus for wireless communication, comprising:
means for estimating a number of wireless devices m communicating peer discovery information based on a previous peer discovery time period;
means for determining a number n as a function of the estimated number of wireless devices m, where n is a natural number; and
means for determining a transmission time period for transmitting peer discovery information for a current peer discovery time period based on the number n,
wherein n is greater than or equal to a lower bound and less than or equal to an upper bound, n is approximately equal to the upper bound when m is greater than or equal to the upper bound, n is approximately equal to the lower bound when m is less than or equal to the lower bound, and n is approximately equal to m when m is greater than or equal to the lower bound and less than or equal to the upper bound.

22. An apparatus for wireless communication, comprising:
means for estimating a number of wireless devices m communicating peer discovery information based on a previous peer discovery time period;
means for determining a number n as a function of the estimated number of wireless devices m, where n is a natural number; and
means for determining a transmission time period for transmitting peer discovery information for a current peer discovery time period based on the number n,
wherein the transmission time period is greater than 0 and less than or equal to $j*n*t_p$, where $t_p$ is an average time period for a peer discovery transmission, and j is a rational number greater than 0.

23. The apparatus of claim 22, wherein j is approximately equal to 1.5.

24. An apparatus for wireless communication, comprising:
means for estimating a number of wireless devices m communicating peer discovery information based on a previous peer discovery time period;
means for determining a number n as a function of the estimated number of wireless devices m, where n is a natural number;
means for determining a transmission time period for transmitting peer discovery information for a current peer discovery time period based on the number n; and
means for determining an awake time period based on the estimated number of wireless devices m,
wherein the awake time period is approximately equal to $k*n*t_p$, where $t_p$ is an average time period for a peer discovery transmission, and k is a natural number greater than 1.

25. The apparatus of claim 24, wherein k is approximately equal to 2.

26. An apparatus for wireless communication, comprising:
means for estimating a number of wireless devices m communicating peer discovery information based on a previous peer discovery time period;
means for determining a number n as a function of the estimated number of wireless devices m, where n is a natural number;
means for determining a transmission time period for transmitting peer discovery information for a current peer discovery time period based on the number n;
means for determining an awake time period based on the estimated number of wireless devices m;
means for determining a non peer discovery total time needed for non peer discovery transmissions; and
means for modifying the awake time period based on the non peer discovery total time, wherein the modified awake time period is approximately equal to $k*n*t_p+I_T$, where $t_p$ is an average time period for a peer discovery transmission, n is a function of the estimated number of wireless devices m, k is a natural number greater than 1, and $I_T$ is the non peer discovery total time.

27. A computer program product in a wireless device, comprising:
   a non-transitory computer-readable medium comprising executable code for:
      estimating a number of wireless devices m communicating peer discovery information based on a previous peer discovery time period;
      determining a number n as a function of the estimated number of wireless devices m, where n is a natural number;
      determining a transmission time period for transmitting peer discovery information for a current peer discovery time period based on the number n:,
      determining a tentative transmission time within the transmission time period;
      determining a non peer discovery time period needed for non peer discovery transmissions;
      modifying the tentative transmission time based on the non peer discovery time period; and
      transmitting the peer discovery information at or after the modified transmission time.

28. An apparatus for wireless communication, comprising:
   a processing system configured to:
      estimate a number of wireless devices m communicating peer discovery information based on a previous peer discovery time period;
      determine a number n as a function of the estimated number of wireless devices m, where n is a natural number;
      determine a transmission time period for transmitting peer discovery information for a current peer discovery time period based on the number n;
      determine a tentative transmission time within the transmission time period;
      determine a non peer discovery time period needed for non peer discovery transmissions;
      modify the tentative transmission time based on the non peer discovery time period; and
      transmit the peer discovery information at or after the modified transmission time.

* * * * *